United States Patent [19]
Shephard

[11] 3,795,959
[45] Mar. 12, 1974

[54] CUT-OFF BLADE WITH INSERT

[76] Inventor: Donald L. Shephard, 11500 Lambs Rd., Memphis, Mich. 48041

[22] Filed: Mar. 13, 1972

[21] Appl. No.: 234,224

[52] U.S. Cl. .................................................. 29/96
[51] Int. Cl. ............................................ B26d 1/02
[58] Field of Search ............... 29/95, 96; 82/13, 36; 76/101 R

[56] References Cited
UNITED STATES PATENTS

| | | | |
|---|---|---|---|
| 3,516,310 | 6/1970 | Lemanski | 29/96 X |
| 3,320,653 | 5/1967 | Shephard | 29/95 |
| 2,623,271 | 12/1952 | Girardin | 29/96 |
| 2,944,323 | 7/1960 | Stadler | 76/101 X |
| 2,623,271 | 12/1952 | Girardin | 29/96 |
| 2,944,323 | 7/1960 | Stadler | 76/101 X |
| 3,320,653 | 5/1967 | Shephard | 29/95 |
| 3,516,310 | 6/1970 | Lemanski | 29/96 X |

Primary Examiner—Andrew R. Juhasz
Assistant Examiner—William R. Briggs
Attorney, Agent, or Firm—Cullen, Settle, Sloman & Cantor

[57] ABSTRACT

A cutting blade of the cut-off type improved in the provision of a groove in the blade face receiving a separate insert.

3 Claims, 6 Drawing Figures

PATENTED MAR 12 1974 3,795,959
FIG. 1
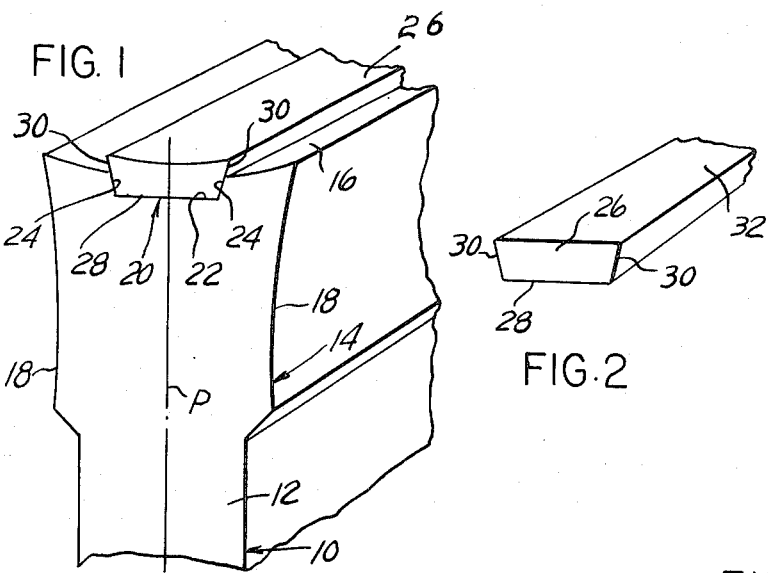
FIG. 2
FIG. 3
FIG. 4
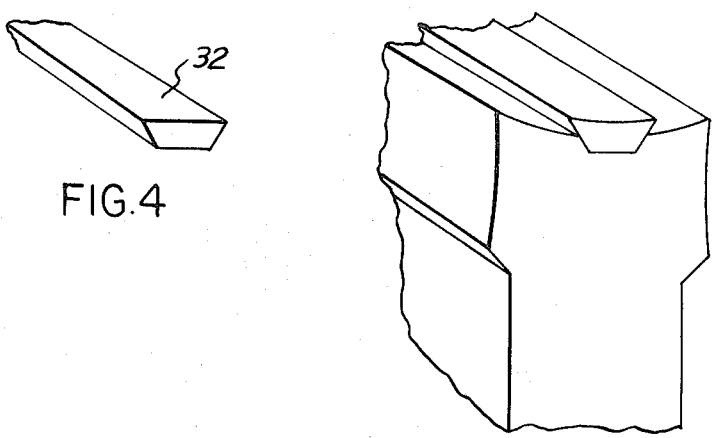
FIG. 5
FIG. 6
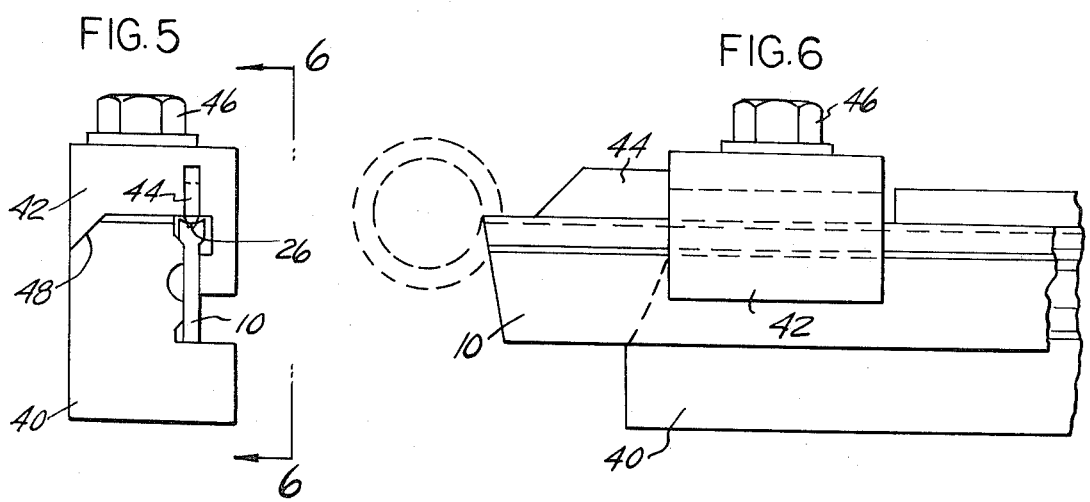

CUT-OFF BLADE WITH INSERT

This application relates to cutting blades of the general class shown in said patent, but characterized by the provision of a groove in the upper face of the blade receiving a separate insert.

A primary object of the present invention is to provide a blade having a groove receiving an separate insert, the latter functioning along with the blade for improving the cutting action.

A further object is to provide a blade having a groove and a separate insert in such groove, the insert being adapted to be removably but firmly held in the groove, preferably by releasable clamping means, whereby the insert may be easily assembled upon the blade body.

Preferred embodiments of the present invention have been shown, it being understood that the illustrations are by way of example only, and without limitation to the details of the blades illustrated.

The preferred embodiments are shown in the appended drawing. In the drawing:

FIG. 1 is a fragmentary front perspective view of one form of the blade with one form of insert in place.

FIG. 2 is a perspective view of a modified form of insert for the blade of FIG. 1.

FIG. 3 is a view similar to FIG. 1 of a second form of blade with one form of insert in place.

FIG. 4 is an end view of a modified form of insert for the blade of FIG. 3.

FIG. 5 is a small scale end view of a mechanical holder for the blade and its insert.

FIG. 6 is a fragmentary side view as if on arrow 6 of FIG. 5.

DETAILED DESCRIPTION

FIG. 1 shows, an elongated blade 10 having a narrow shank 12, and an enlarged wider head 14, hollow ground across its upper face 16 and its sides 18. Face 16 has a longitudinally extending groove 20 with base 22 and tapered sides 24, firmly seating an elongated insert 26, also having a base 28, tapered sides 30 and face 32.

Sides 24, 30 are at complementary symmetrical acute angles to the central axial plane P of the blade so that the groove is of tapered truncated Vee form, whereby the insert will seat firmly in the groove, to seal it and thus inhibit lodgement of chips and cuttings in the groove.

The acute angles may be of one dimension, as shown in FIGS. 1–2, or of another, as shown in FIGS. 3–4.

The insert faces 32 may be flat ground, as in FIGS. 2 and 4, or hollow ground, as in FIGS. 1 and 3.

The insert may be brazed into the groove; but, for reasons of economy and throwaway, it is preferred to leave it free of the blade, and to clamp it in place in the groove during blade use.

The insert and blade are separate, and separately formed to accurate dimension, so that proper assembly, that is to say, proper seating and clamping of the insert in the groove causes the insert to seat so in the groove as to seal it and thus prevent chip lodgement or insert deplacement.

The insert may be shipped to the customer by the blade maker in a prefinished form, and the customer will then grind the insert for final use; or this finishing may be done by the blade maker, before shipment.

A mechanical holder for the blade and insert is shown, by way of example, in FIGS. 5–6. The holder includes a base block 40, a blade clamp 42 having an insert clamp 44, and a screw bolt 46 as shown. When the screw 46 is tightened down, it causes the blade clamp 42 and the insert clamp 44 to clamp the blade 10 and insert 26 properly in place in block 40 and in groove 20, the bevel at 48 of parts 40–42 assisting in the clamping action.

It may be, however, though it is not preferred, that the insert may be permanently held in groove 20 by brazing or the like. A blade holder is nevertheless required in use.

CONCLUSION

It will be observed that the two-piece blade herein disclosed, including the basic blade and an insert seated in a groove of such blade, provides a more effective cutting action because of the presence of four cutting points, two on the outer exposed edges of the insert and two at the outer exposed edges of the blade, and thus provides a more effective and useful cutting means.

It will also be observed that the insert, whether brazed for holding it in the groove or whether held by the releasable clamp means shown in FIGS. 5–6, in either case, the insert completely seals the groove and prevents the lodging of chips in the groove.

Now having described the blade herein disclosed, reference should be had to the claims which follow.

I claim:

1. In an elongated blade of the character described, having a narrow shank and thereabove an enlarged wider head; the improvement comprising:

the upper face of said head having a longitudinally extending groove between and spaced from the sides of the head; in combination with an elongated and longitudinally extending separate cutter insert seated in said groove;

with the sides of the groove and the sides of the insert being at complementary acute angles to the central axial plane of the blade so that the groove is of truncated Vee form;

with the groove and the insert widening outwardly, whereby the insert tends to wedge downward into the groove; and with the insert tending to seal the groove completely to inhibit lodgement of chips in such groove;

with the groove and insert being so dimensioned that the insert completely fills and seals the groove, when the insert is removably seated and wedged down into the groove, and even though not integrally fixed in the groove, whereby the lodging of cuttings or chips in the groove is assuredly completely inhibited;

with the sides of the head being undercut and with the insert projecting well above the blade to expose the sides of the insert above the blade;

with the exposed insert sides thus also being undercut, to provide three cutting edges and to eliminate radii at the intersections of the upper face of the head and the side faces of the insert;

and with the sides of the blade being so remote from the sides of the groove that the wall areas of the blade on both sides of the groove are of sufficient thickness to provide side brace abutments of considerable strength to bear against the sides of the insert, in thickness sufficient to prevent chattering of the insert during cutting use of the blade and insert;

and with the central cutting edge on the insert overhanging both side cutting edges of the blade head by virtue of the acute angular disposition of the insert.

2. A blade according to claim 1, in further combination with a mechanical holder for a blade and an insert in the blade groove, including means for holding the blade firmly when it is in use, and simultaneously firmly and adjustably but releasably biasing and wedging the insert downwardly and properly into the blade groove.

3. A blade and insert combination according to claim 1, wherein the sides of the insert are each formed in one continuous plane, which includes that part of the side in the groove, and also that part of the side exposed above the groove.

* * * * *